US007065778B1

United States Patent
Lu

(10) Patent No.: US 7,065,778 B1
(45) Date of Patent: Jun. 20, 2006

(54) METHOD AND SYSTEM FOR PROVIDING MEDIA FROM REMOTE LOCATIONS TO A VIEWER

(75) Inventor: Bin Lu, Stanford, CA (US)

(73) Assignee: EnReach Technologies, Inc., San Jose, CA (US)

( * ) Notice: Subject to any disclaimer, the term of this patent is extended or adjusted under 35 U.S.C. 154(b) by 492 days.

(21) Appl. No.: 09/865,970

(22) Filed: May 25, 2001

(51) Int. Cl.
*H04N 7/173* (2006.01)
(52) U.S. Cl. .......................... 725/98; 725/103; 386/83
(58) Field of Classification Search ................. 725/90, 725/91, 92, 93, 94, 103, 58, 86; 386/83
See application file for complete search history.

(56) References Cited

U.S. PATENT DOCUMENTS

| | | | | |
|---|---|---|---|---|
| 5,285,272 A | * | 2/1994 | Bradley et al. | 725/115 |
| 5,557,317 A | * | 9/1996 | Nishio et al. | 725/92 |
| 5,715,403 A | * | 2/1998 | Stefik | 705/44 |
| 6,195,692 B1 | * | 2/2001 | Hsu | 725/110 |
| 6,684,399 B1 | * | 1/2004 | Grooters | 725/48 |
| 6,769,127 B1 | * | 7/2004 | Bonomi et al. | 725/39 |
| 2002/0154892 A1 | * | 10/2002 | Hoshen et al. | 386/87 |
| 2002/0162109 A1 | * | 10/2002 | Shteyn | 725/87 |

OTHER PUBLICATIONS

U.S. Appl. No. 09/586,247, "Method and System for Recording Scheduled Programs Without Local Recording Equipment" Cao et al, filed May 31, 2000.*

* cited by examiner

*Primary Examiner*—James J. Groody
*Assistant Examiner*—James A. Fletcher

(57) ABSTRACT

One embodiment of the present invention enables a user to utilize a personalized video recorder (PVR) to order and receive specific television shows that are unavailable from his or her television content provider. Specifically, the PVR is coupled to the Internet such that it can receive an electronic programming guide (EPG) containing worldwide television programming from an EPG server computer. The PVR user utilizes the EPG to request delivery of a specific television show that is typically unavailable to him or her. Upon reception of the request, the EPG server computer locates via the Internet a PVR situated within a broadcast region of the requested television show. Next, the EPG server computer programs the PVR to record the requested television show when it is broadcast. Once the PVR records the television show, it is transmitted to the EPG server computer which transmits it to the requesting PVR.

39 Claims, 11 Drawing Sheets

METHOD AND SYSTEM FOR PROVIDING MEDIA FROM REMOTE LOCATIONS TO A VIEWER

TECHNICAL FIELD

The present invention relates to the field of television programming distribution. More specifically, the present invention relates to the field of utilizing personalized video recorders and other similar types of devices to distribute television programming.

BACKGROUND ART

Modern research and technology have provided society with a wide variety of electronic devices. It is appreciated that some of these modern electronic devices are very powerful and useful to their users. For example, some of the electronic devices which fall into this category include: computers which occupy large office space down to computers which are held in one's hand, satellites which orbit around earth relaying a multitude of communication signals, global positioning system (GPS) devices capable of determining the specific locations of their users on the earth, cellular phones which enable their users to communicate wirelessly with other people, to name a few. Additionally, it should be appreciated that some modern electronic devices also provide entertainment to their users. For instance, some of the electronic devices which fall into this category include: portable and fixed radio receivers which provide their users music along with a wide array of different audio programming, video game consoles which challenge their users with varying situations within different virtual realities, portable and fixed compact disc (CD) players which provide music to their users, and portable and fixed televisions which provide a wide variety of visual and audio programming to their users.

It is appreciated that television programming is distributed to televisions of the general public in a wide variety of ways. For example, consumers of the general public are able to receive television programming on their televisions within their households and/or businesses via coaxial cables, personal satellite dishes (large or small), antennas, broadband Internet, and the like. Furthermore, most of these ways of distributing television programming provide the general public an ever increasing amount of television programming.

For example, not that long ago there use to be only three major television broadcast companies basically providing nationwide television programming throughout the entire United States of America. In contrast, currently there may be as many as one hundred times more television channels that are basically providing nationwide television programming. Furthermore, it is appreciated that some of these television channels are continuously broadcasting television programming 24 hours a day (e.g., ESPN, VH1, CNN, QVC, and the like). Consequently, there is a large amount of television programming available to consumers of the general public.

However, it should be appreciated that there are some disadvantages associated with the distribution of television programming. For instance, one of the disadvantages is that a typical television viewer does not have access to all of the television programming that is broadcast throughout the world. Therefore, the typical television viewer is unable to view television programming that he or she would be interested in viewing because it is being broadcast in remote cities, states, and/or countries.

DISCLOSURE OF THE INVENTION

Accordingly, a need exists for a method and system which enables television viewers to receive desired television programming which is broadcast in remote locations throughout the world. The present invention provides a method and system which accomplishes the above mentioned need.

For instance, one embodiment of the present invention enables a user to utilize a personalized video recorder (PVR) to order and receive specific television shows that are unavailable from his or her television content provider. Specifically, the personalized video recorder is coupled to the Internet such that it can receive an electronic programming guide (EPG) containing worldwide television programming from an EPG server computer. The personalized video recorder user is able to utilize the EPG to request delivery of a specific television show that is unavailable to him or her. Upon reception of the request, the EPG server computer locates via the Internet one or more personalized video recorders situated within a broadcast region of the requested television show. Next, the EPG server computer programs one or more personalized video recorders to record the requested television show when it is broadcast. Once the personalized video recorders record the television show, one or more of the personalized video recorders may transmit it to the EPG server computer which then transmits it to the requesting personalized video recorder.

In another embodiment, the present invention includes a computer readable medium having computer readable code embodied therein for causing a system to perform particular steps. The computer readable medium causes the system to perform the step of a server computer receiving a request from a receiver device for a media content. Additionally, the computer readable medium causes the system to perform the step of the server computer locating a recorder device capable of receiving a transmission of the media content that satisfies the request. Furthermore, the computer readable medium causes the system to perform the step of the recorder device receiving a programming instruction from the server computer to record the media content when transmitted by a media content provider. Moreover, the computer readable medium causes the system to perform the step of the recorder device recording the media content during transmission of the media content by the media content provider. The computer readable medium also causes the system to perform the step of the receiver device receiving the media content recorded by the recorder device.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
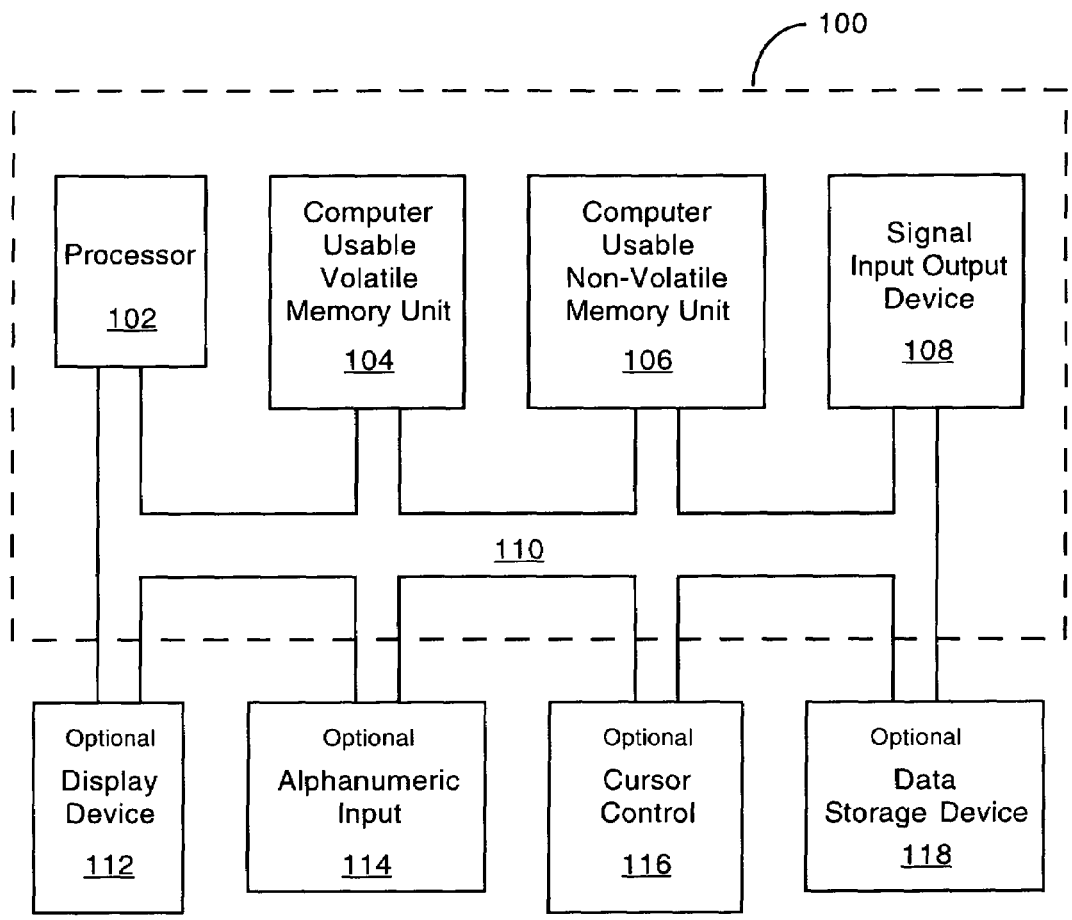
FIG. 1 is a block diagram of an exemplary computer system used in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "determining" or "outputting" or "transmitting" or "recording" or "locating" or "storing" or "displaying" or "receiving" or "recognizing" or "utilizing" or "generating" or "providing" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Exemplary Hardware in Accordance with the Present Invention

FIG. 1 is a block diagram of one embodiment of an exemplary computer system 100 used in accordance with the present invention. It should be appreciated that system 100 is not strictly limited to be a computer system. As such, system 100 of the present embodiment is well suited to be any type of computing device (e.g., server computer, portable computing device, etc.). Within the following discussions of the present invention, certain processes and steps are discussed that are realized, in one embodiment, as a series of instructions (e.g., software program) that reside within computer readable memory units of computer system 100 and executed by a processor(s) of system 100. When executed, the instructions cause computer 100 to perform specific actions and exhibit specific behavior which is described in detail below.

Computer system 100 of FIG. 1 comprises an address/data bus 110 for communicating information, one or more central processors 102 coupled with bus 110 for processing information and instructions. Central processor unit 102 may be a microprocessor or any other type of processor. The computer 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes one or more signal generating and receiving devices 108 coupled with bus 110 for enabling system 100 to interface with other electronic devices. The communication interface(s) 108 of the present embodiment may include wired and/or wireless communication technology. For example, in one embodiment of the present invention, the communication interface 108 is a serial communication port, but could also alternatively be any of a number of well known communication standards and protocols, e.g., Universal Serial Bus (USB), Ethernet, FireWire® (IEEE 1394), parallel, small computer system interface (SCSI), infrared (IR) communication, Bluetooth® wireless communication, broadband, and the like.

Optionally, computer system 100 can include an alphanumeric input device 114 including alphanumeric and function keys coupled to the bus 110 for communicating information and command selections to the central processor(s) 102. The computer 100 can include an optional cursor control or cursor directing device 116 coupled to the bus 110 for communicating user input information and command selections to the central processor(s) 102. The cursor directing device 116 can be implemented using a number of well known devices such as a mouse, a track ball, a track pad, an optical tracking device, a touch screen, etc. Alternatively, it is appreciated that a cursor can be directed and/or activated via input from alphanumeric input device 114 using special keys and key sequence commands. The present embodiment is also well suited to directing a cursor by other means such as, for example, voice commands. The system 100 can also include a computer usable mass data storage device 118 such as a magnetic or optical disk and disk drive (e.g., hard drive or floppy diskette) coupled with bus 110 for storing information and instructions. An optional display device 112 is coupled to bus 110 of system 100 for displaying video and/or graphics. It should be appreciated that optional display device 112 may be a cathode ray tube (CRT), flat panel liquid crystal display (LCD), field emission display (FED), or any other display device suitable for displaying video and/or graphic images and alphanumeric characters recognizable to a user.

Figure 2:
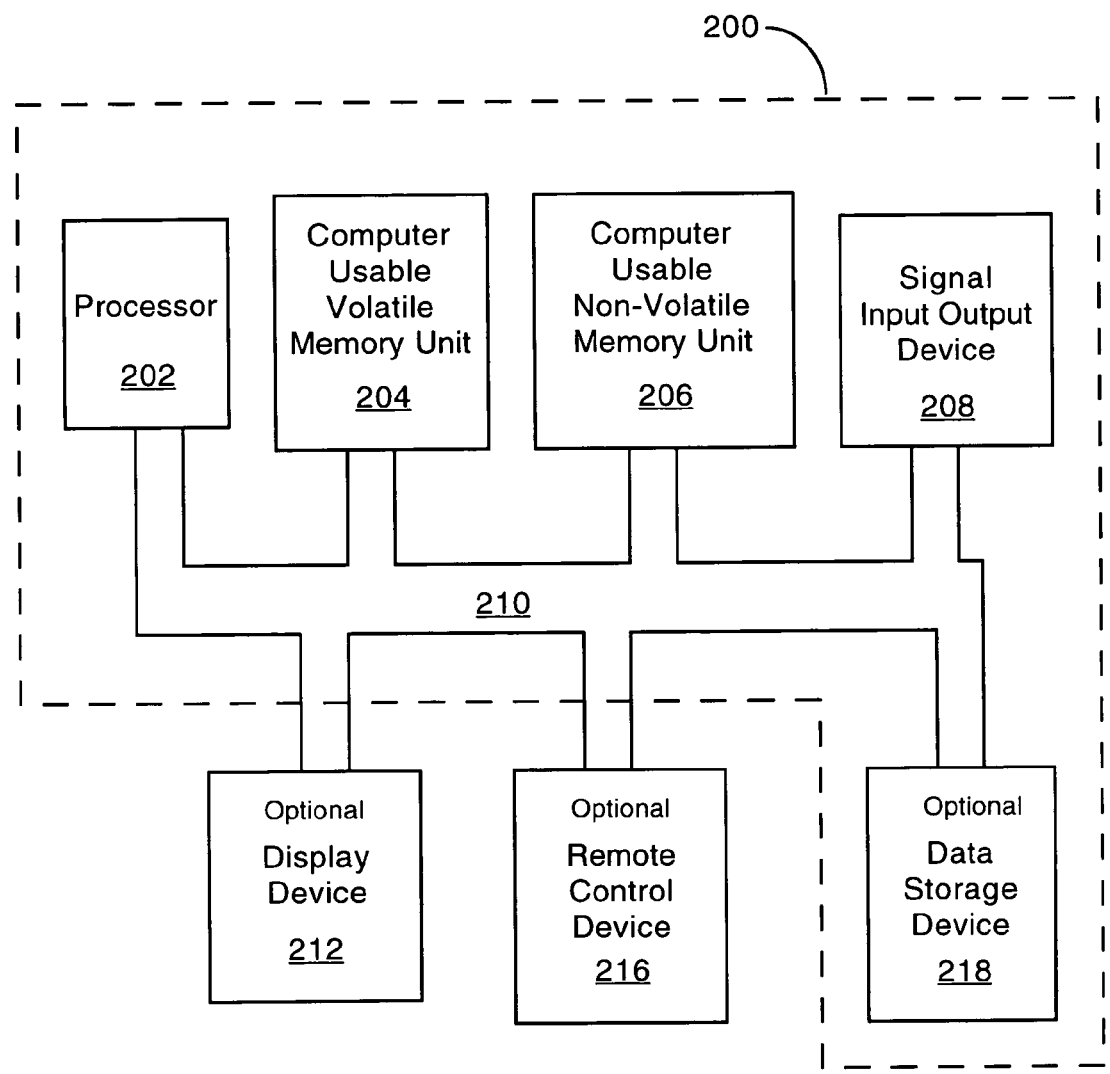
FIG. 2 is a block diagram of an exemplary personalized video recorder (PVR) used in accordance with one embodiment of the present invention.

FIG. 2 is a block diagram of one embodiment of an exemplary personalized video recorder (PVR) 200 used in accordance with the present invention. It is appreciated that some of the components of personalized video recorder 200 are similar to the components of computer system 100 of FIG. 1, described above. It should be understood that other electronic devices and/or systems (e.g., set-top-box, computer, television Internet box, digital video recorder, and the like) may also function in a manner similar to personalized video recorder 200 in accordance with the present invention. Furthermore, any electronic device and/or system capable of encoding and/or decoding and/or transferring media content may be substituted for the personalized video recorder 200 of the present embodiment. Within the following discussions of the present invention, certain processes and steps are discussed that are realized, in one embodiment, as a series of instructions (e.g., software program) that reside within computer readable memory units of personalized video recorder 200 and executed by a processor(s) of personalized video recorder 200. When executed, the instructions cause personalized video recorder 200 to perform specific actions and exhibit specific behavior which is described in detail below.

Personalized video recorder 200 of FIG. 2 comprises an address/data bus 210 for communicating information, one or more central processors 202 coupled with bus 210 for processing information and instructions. Central processor unit 202 may be a microprocessor or any other type of processor. The personalized video recorder 200 also includes data storage features such as a computer usable volatile memory unit 204 (e.g., random access memory, static RAM, dynamic RAM, etc.) coupled with bus 210 for storing information and instructions for central processor(s) 202, a computer usable non-volatile memory unit 206 (e.g., read only memory, programmable ROM, flash memory, EPROM, EEPROM, etc.) coupled with bus 210 for storing static information and instructions for processor(s) 202. The personalized video recorder 200 also includes one or more signal generating and receiving devices 208 coupled with bus 210 for enabling personalized video recorder 200 to interface with other electronic devices. The communication interface(s) 208 of the present embodiment may include wired and/or wireless communication technology. For example, in one embodiment of the present invention, the communication interface 208 is a serial communication port, but could also alternatively be any of a number of well known communication standards and protocols, e.g., USB, Ethernet, FireWire® (IEEE 1394), parallel, SCSI, Bluetooth® wireless communication, IR communication, broadband, and the like.

Additionally, the personalized video recorder 200 of FIG. 2 can include an optional remote control device 216 (e.g., a universal remote control device having a number of buttons, dials, etc.) which is communicatively coupled to bus 210 for communicating user input information and command selections to the central processor(s) 202. It is appreciated that remote control device 216 may be implemented with the capability to communicate with personalized video recorder 200 utilizing wireless communication (e.g., infrared signaling). The personalized video recorder 200 can also include an optional computer usable mass data storage device 218 such as a magnetic or optical disk and disk drive (e.g., hard drive or floppy diskette) coupled with bus 210 for storing information and instructions. An optional display device 212 is coupled to bus 210 of personalized video recorder 200 for displaying video and/or graphics. It should be appreciated that optional display device 212 may be a cathode ray tube (CRT), flat panel liquid crystal display (LCD), field emission display (FED), or any other display device suitable for displaying video and/or graphic images and alphanumeric characters recognizable to a user.

Exemplary Networks in Accordance with the Present Invention

Figure 3:
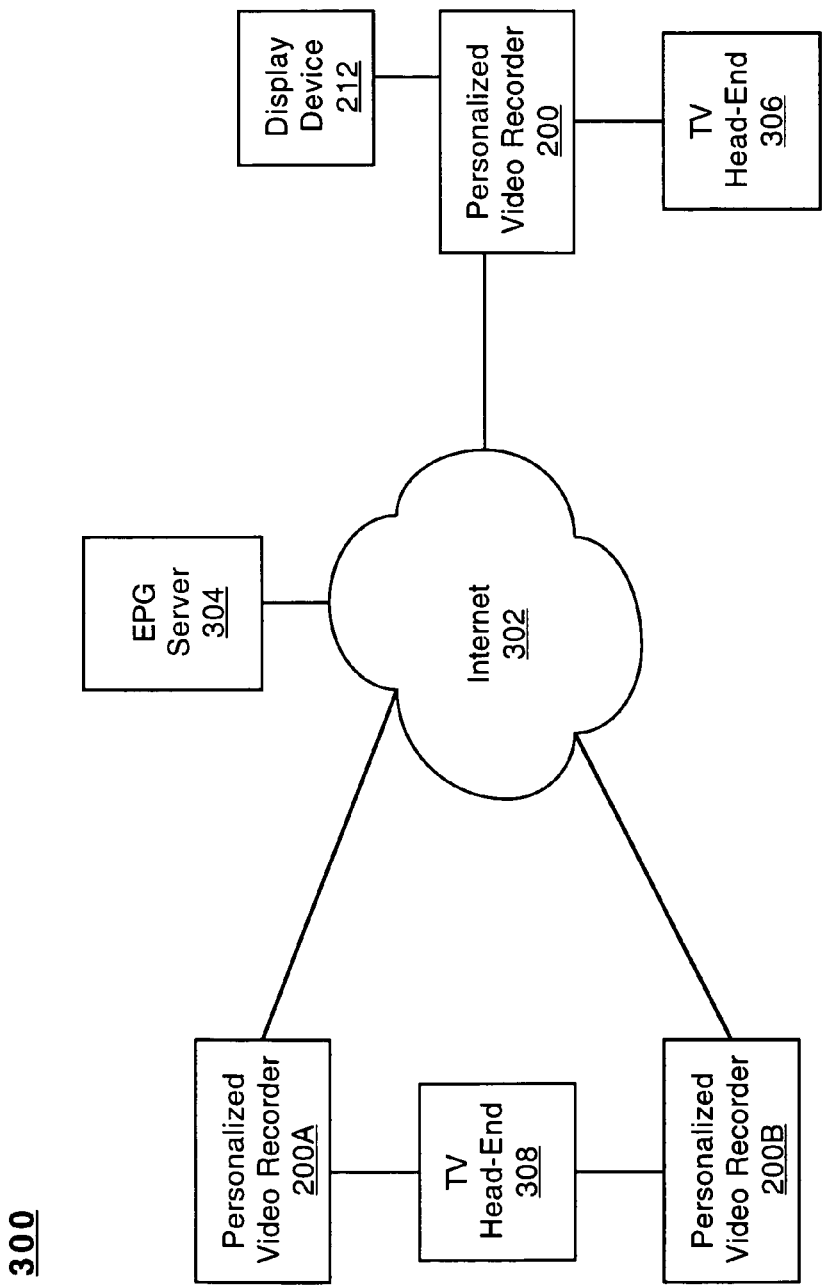
FIG. 3 is a block diagram of an exemplary network used in accordance with one embodiment of the present invention for enabling personalized video recorders to receive specific television shows from remote locations.

FIG. 3 is a block diagram of an exemplary network 300 used in accordance with one embodiment of the present invention. For example, the present embodiment enables a user to utilize personalized video recorder (PVR) 200 to order and receive specific television shows that are unavailable from his or her television content provider (e.g., television head-end 306). Specifically, personalized video recorder 200 is coupled to the Internet 302 such that it can receive an electronic programming guide (EPG) containing worldwide television programming from an EPG server computer 304. The user of personalized video recorder 200 utilizes the EPG to request delivery of a specific television show that may not be available to him or her. Upon reception of the request from personalized video recorder 200, EPG server computer 304 locates via Internet 302 one or more personalized video recorders (e.g., 200A and/or 200B) situated within a broadcast region of the requested television show. Subsequently, EPG server computer 304 programs one or more personalized video recorders (e.g., 200A and/or 200B) to record the requested television show when it is broadcast by a television content provider (e.g., television head-end 308). Once the personalized video recorders (e.g., 200A and 200B) record the television show, one or more of the personalized video recorders may transmit it to EPG server computer 304 which then transmits it to the requesting personalized video recorder 200. In this manner, the present embodiment enables personalized video recorder 200 to order and receive specific television shows that are unavailable from its television content provider (e.g., 306).

Network 300 includes EPG server computer 304 and personalized video recorders 200, 200A, and 200B which are communicatively coupled to the Internet 302. Additionally, television head-end 306 is communicatively coupled to personalized video recorder 200 while television head-end 308 is communicatively coupled to personalized video recorders 200A and 200B. It should be appreciated that the devices of network 300 of the present embodiment are well suited to be coupled in a wide variety of implementations. For example, personalized video recorders 200, 200A and 200B, television head-ends 306 and 308, and EPG server computer 304 of network 300 may be coupled via coaxial cable, copper wire, fiber optics, the Internet 302, wireless communication, and the like.

Within network 300 of FIG. 3, it is understood that personalized video recorders 200A and 200B are each implemented in a manner similar to personalized video recorder 200 of FIG. 2. Moreover, server computer 304 may be implemented in a variety ways in accordance with the present embodiment. For example, server computer 304 of network 300 may be implemented in a manner similar to computer system 100 of FIG. 1. However, this device of network 300 is not strictly limited to such an implementation. Additionally, it is appreciated that the server computer 304 performs a variety of functionality within network 300. It should be understood that server computer 304 may actually reside on a single physical computing device (e.g., computer 100 of FIG. 1). However, server computer 304 of the present embodiment may be implemented as one or more physical computing devices (e.g., computer 100).

It is appreciated that network 300 of FIG. 3 may be modified to enabling it to operate with any type of media content (e.g., audio, video, graphics, information, data, software, and/or the like) in any type of format. For example, the television content providers (e.g., television head-ends 306 and 308) may be substituted with any type of media content providers. Additionally, the EPG server computer 304 may be modified such that its EPG provides a management system to personalized video recorders (e.g., 200) for any type of media content. Furthermore, the EPG server computer 304 may also be modified such that it does not provide an EPG to personalized video recorders (e.g., 200), but instead provides them a different type of management system for any type of media content.

Figure 4:
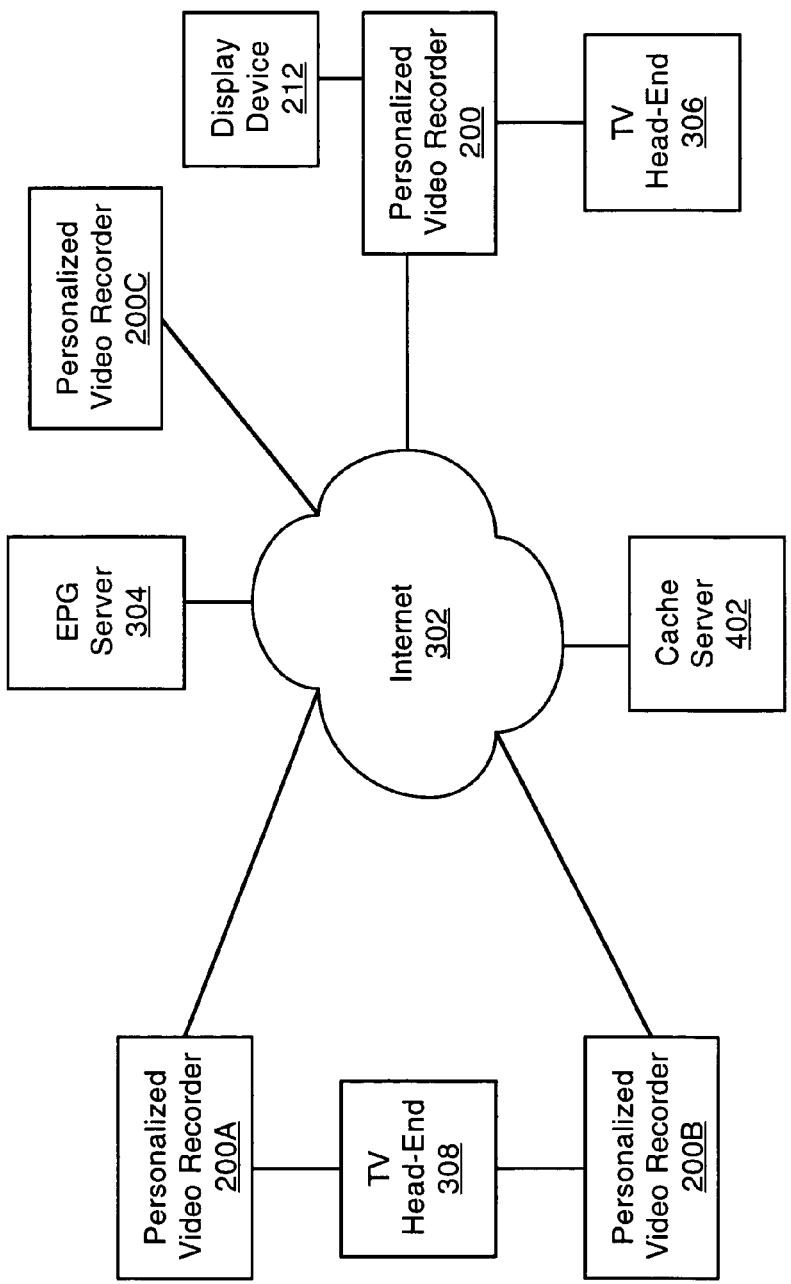
FIG. 4 is a block diagram of another exemplary network used in accordance with one embodiment of the present invention for enabling personalized video recorders to receive specific television shows from remote locations.

FIG. 4 is a block diagram of an exemplary network 400 used in accordance with one embodiment of the present invention for enabling a personalized video recorder (e.g., 200) to order and receive television shows that are unavailable from its television content provider (e.g., television head-end 306). It is appreciated that personalized video recorder 200 of FIG. 4 orders a specific television show in a manner similar to that described above with reference to personalized video recorder 200 of FIG. 3. However, once the personalized video recorders (e.g., 200A and 200B) record the requested television show, one or more of the personalized video recorders may transmit a copy of it to a cache server (e.g., 402) which subsequently stores it and transmits a copy of it to the requesting personalized video recorder 200. Moreover, if another personalized video recorder (e.g., 200C) subsequently requests a copy of the same television show from server computer 304, it causes cache server 402 to transmit a copy of the same television show to the other requesting personalized video recorder (e.g., 200C). In this manner, the present embodiment enables personalized video recorders (e.g., 200 and 200C) to order and receive specific television shows that are unavailable from their television content provider.

Network 400 includes electronic programming guide server 304, personalized video recorders 200, 200A and 200B and television head-ends 306 and 308. It is appreciated that these devices of network 400 may be communicatively coupled in any manner similar to that described above with reference to network 300 of FIG. 3. Furthermore, network 400 includes cache server 402 and personalized video recorder 200C which are communicatively coupled to the Internet 302. However, cache server 402 and personalized video recorder 200C of the present embodiment are well suited to be coupled to the other devices of network 400 in a wide variety of implementations. For example, personalized video recorders 200, 200A, 200B and 200C, cache server 402, television head-ends 306 and 308, and server computer 304 of network 400 may be coupled via coaxial cable, copper wire, fiber optics, the Internet 302, wireless communication, and the like.

Within network 400 of FIG. 4, it is understood that personalized video recorders 200A, 200B, and 200C are each implemented in a manner similar to personalized video recorder 200 of FIG. 2. Furthermore, cache server 402 and EPG server computer 304 may be implemented in a variety ways in accordance with the present embodiment. For example, cache server 402 and server computer 304 of network 400 may be implemented in a manner similar to computer system 100 of FIG. 1. However, these devices of network 400 are not strictly limited to such an implementation. Additionally, it is appreciated that cache server 402 and EPG server computer 304 perform a variety of functionality within network 400. It is understood that cache server 402 and server computer 304 may actually reside on a single physical computing device (e.g., computer 100 of FIG. 1). Conversely, cache server 402 and server computer 304 of the present embodiment may each be implemented as one or more physical computing devices (e.g., computer 100).

It is appreciated that network 400 of FIG. 4 may be modified to enabling it to operate with any type of media content (e.g., audio, video, graphics, information, data, software, and/or the like) in any type of format. For example, the television content providers (e.g., television head-ends 306 and 308) may be substituted with any type of media content providers. Additionally, the EPG server computer 304 may be modified such that its EPG provides a management system to personalized video recorders (e.g., 200 and 200C) for any type of media content. Furthermore, the EPG server computer 304 may also be modified such that it does not provide an EPG to personalized video recorders (e.g., 200 and 200C), but instead provides them a different type of management system for any type of media content. Moreover, the cache server 402 may be modified such that it operates with any type of media content.

Exemplary Operations in Accordance with the Present Invention

Figure 5:
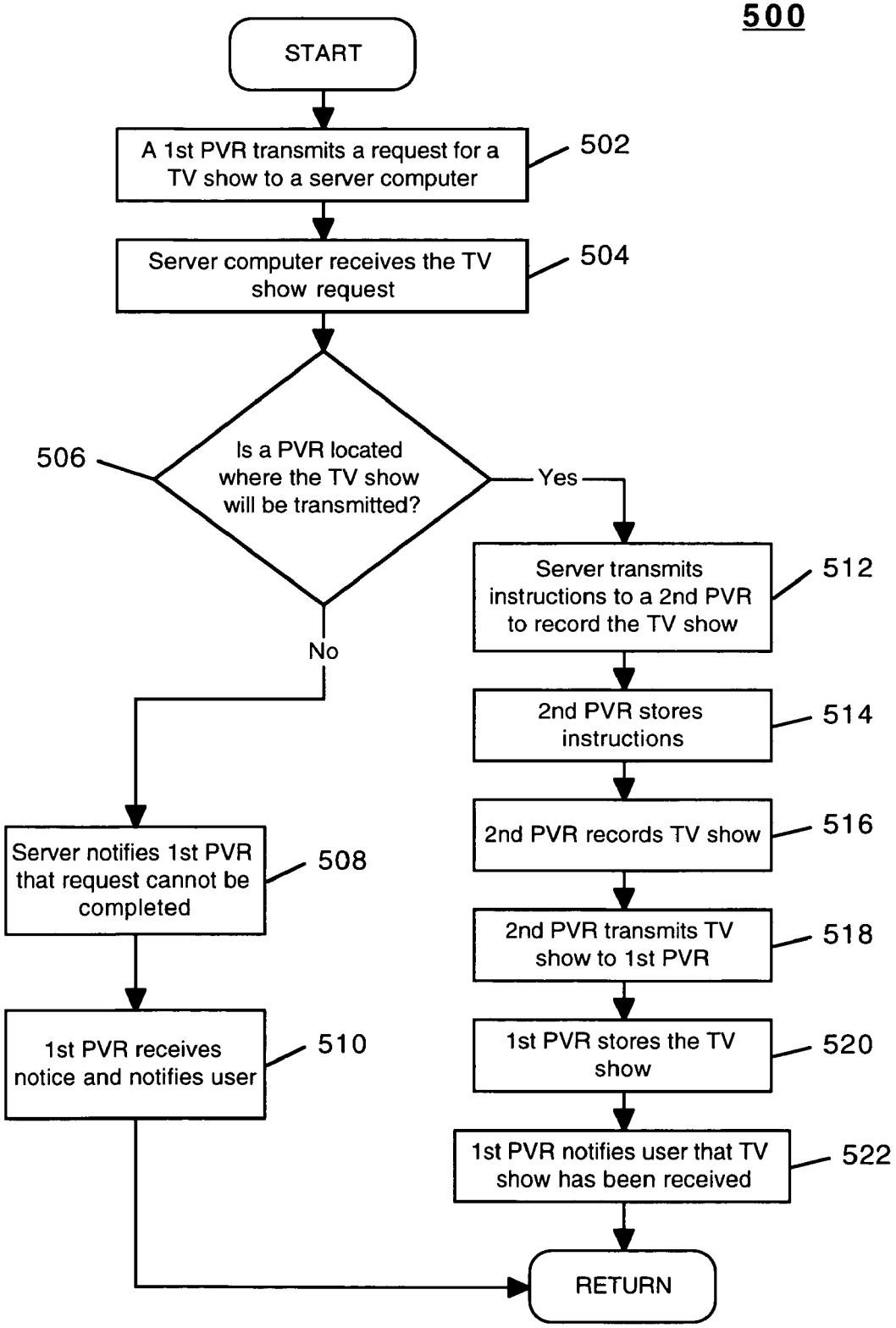
FIG. 5 is a flowchart of steps performed in accordance with one embodiment of the present invention for enabling a personalized video recorder to receive specific television shows from a remote personalized video recorder.

FIG. 5 is a flowchart 500 of steps performed in accordance with one embodiment of the present invention for enabling a personalized video recorder (e.g., 200) to receive specific television shows from one or more remote personalized video recorders (e.g., 200A and 200B). Flowchart 500 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 500, such steps are exemplary. That is, the present invention is well suited to performing various other steps or variations of the steps recited in FIG. 5. Within the present embodiment, it should be appreciated that the steps of flowchart 500 may be performed by software or hardware or any combination of software and hardware.

The present embodiment enables personalized video recorder 200 to order and receive specific television shows that may be unavailable from its television content provider (e.g., television head-end 306). Specifically, personalized video recorder 200 transmits a request for delivery of a specific television show to a server computer (e.g., 304) that is communicatively coupled to it. Upon reception of the request from personalized video recorder 200, the server computer determines whether a personalized video recorder (e.g., 200A or 200B) coupled to it is located within a transmission region of the requested television show. If there is, the server computer transmits programming instructions to that personalized video recorder (e.g., 200A or 200B) to record the requested television show when it is transmitted by a television content provider (e.g., television head-end 308). Once the personalized video recorder (e.g., 200A or 200B) records the television show, it transmits the television show to personalized video recorder 200 which is coupled to it. In this manner, the present embodiment enables personalized video recorder 200 to order and receive specific television shows that are unavailable from its television content provider (e.g., 306).

It should be appreciated that flowchart 500 is described in conjunction with FIG. 3 in order to more fully describe the operation of the present embodiment. At step 502 of FIG. 5, the present embodiment causes personalized video recorder 200 to transmit a request for delivery of a specific television show to server computer 304 that is communicatively coupled to it. The present embodiment may perform step 502 in a wide variety of ways in accordance with the present invention. For example, it is appreciated that personalized video recorder 200 may receive an electronic programming guide (EPG) containing worldwide television programming from EPG server computer 304. As such, the present embodiment at step 502 may enable a user of personalized video recorder 200 to utilize the received electronic programming guide to transmit a request to server computer 304 for delivery of a specific television show. In step 504, server computer 304 receives the television show request from personalized video recorder 200.

At step 506, the present embodiment determines whether server computer 304 is coupled to a personalized video recorder (e.g., 200A or 200B) located within a transmission region of the requested television show. If the present embodiment determines that server computer 304 is coupled to a personalized video recorder located within the transmission region of the requested television show at step 506, the present embodiment proceeds to step 512. However, if the present embodiment determines that server computer 304 is not coupled to a personalized video recorder located within the transmission region of the requested television show at step 506, the present embodiment proceeds to step 508.

In step 508, the present embodiment causes server computer 304 to transmit a notification to personalized video recorder 200 indicating that the requested television show cannot be delivered at this time. At step 510, once personalized video recorder 200 receives the notification, the present embodiment causes personalized video recorder 200 to informs its user of this information. It is appreciated that the present embodiment may perform step 510 in a wide variety of ways in accordance with the present invention. For example, the present embodiment may cause personalized video recorder 200 to output to display device 212 a message informing its user that the requested television show cannot be delivered at this time. After the completion of step 510, the present embodiment exits flowchart 500.

At step 512 of FIG. 5, the present embodiment causes server computer 304 to transmit programming instructions to a personalized video recorder (e.g., 200A or 200B) to record the requested television show when it is transmitted by a television content provider (e.g., television head-end 308). Furthermore, the programming instructions of step 512 may also include an Internet Protocol (IP) address of a device (e.g., personalized video recorder 200) that the personalized video recorder (e.g., 200A or 200B) should transmit the requested television show to once it has been recorded. In step 514, after receiving the programming instructions, the present embodiment causes the personalized video recorder (e.g., 200A or 200B) to add them to its programmable task list. At step 516, the present embodiment causes the personalized video recorder (e.g., 200A or 200B) to subsequently record the requested television show during its transmission by the television content provider (e.g., television head-end 308). Within the present embodiment, it is understood that the transmission of the television show by the television content provider may include a broadcasting or unicasting (e.g., pay-per-view show) format.

In step 518, the present embodiment causes the personalized video recorder (e.g., 200A or 200B) to transmit the recorded television show to personalized video recorder 200. It is understood that the present embodiment may perform step 518 in a wide variety of ways in accordance with the present invention. For example, the present embodiment may cause the personalized video recorder (e.g., 200A or 200B) to utilize the IP address of personalized video recorder 200 in order to transmit the recorded television show to it. As such, the personalized video recorder (e.g., 200A or 200B) is transmitting the recorded television show to personalized video recorder 200 in a point-to-point manner. At step 520, upon receiving the recorded television show, the present embodiment causes personalized video recorder 200 to store it. Within the present embodiment, it is appreciated that personalized video recorder 200 may utilizes one or more of its memory units (e.g., 204, 206, and 218) to store the recorded television show. In step 522, the present embodiment causes personalized video recorder 200 to notify its user that the recorded television show has been received and may now be viewed. It is appreciated that the present embodiment may perform step 522 in a wide variety of ways in accordance with the present invention. For example, the present embodiment may cause personalized video recorder 200 to output to display device 212 a message informing its user that the requested television show has been received and may now be viewed. After the completion of step 522, the present embodiment exits flowchart 500.

It is appreciated that flowchart 500 of FIG. 5 may be modified such that the present embodiment may cause server computer 304 to utilize two or more personalized video recorders (e.g., 200A and 200B) to record the requested television show when it is transmitted by a television content provider (e.g., television head-end 308). One of the reasons for utilizing multiple personalized video recorders (e.g., 200A and 200B) is to ensure that the requested television show is successfully recorded by at least one of the personalized video recorders. For example, a personalized video recorder that has received programming instructions from server computer 304 to record a requested television show may be overridden by its user desiring to record another television show during the same transmission time. As such, any additional programmed personalized video recorders provide a backup system for recording the requested television show.

Flowchart 500 of FIG. 5 is well suited to be modified such that the present embodiment may operate with any type of media content (e.g., audio, video, graphics, information, data, software, and/or the like) in any type of format. For example, the television content providers (e.g., television head-ends 306 and 308) may be substituted with any type of media content providers. Additionally, the server computer (e.g., 304) may be modified such that it provides a management system to personalized video recorders (e.g., 200) for any type of media content.

Figure 6A:
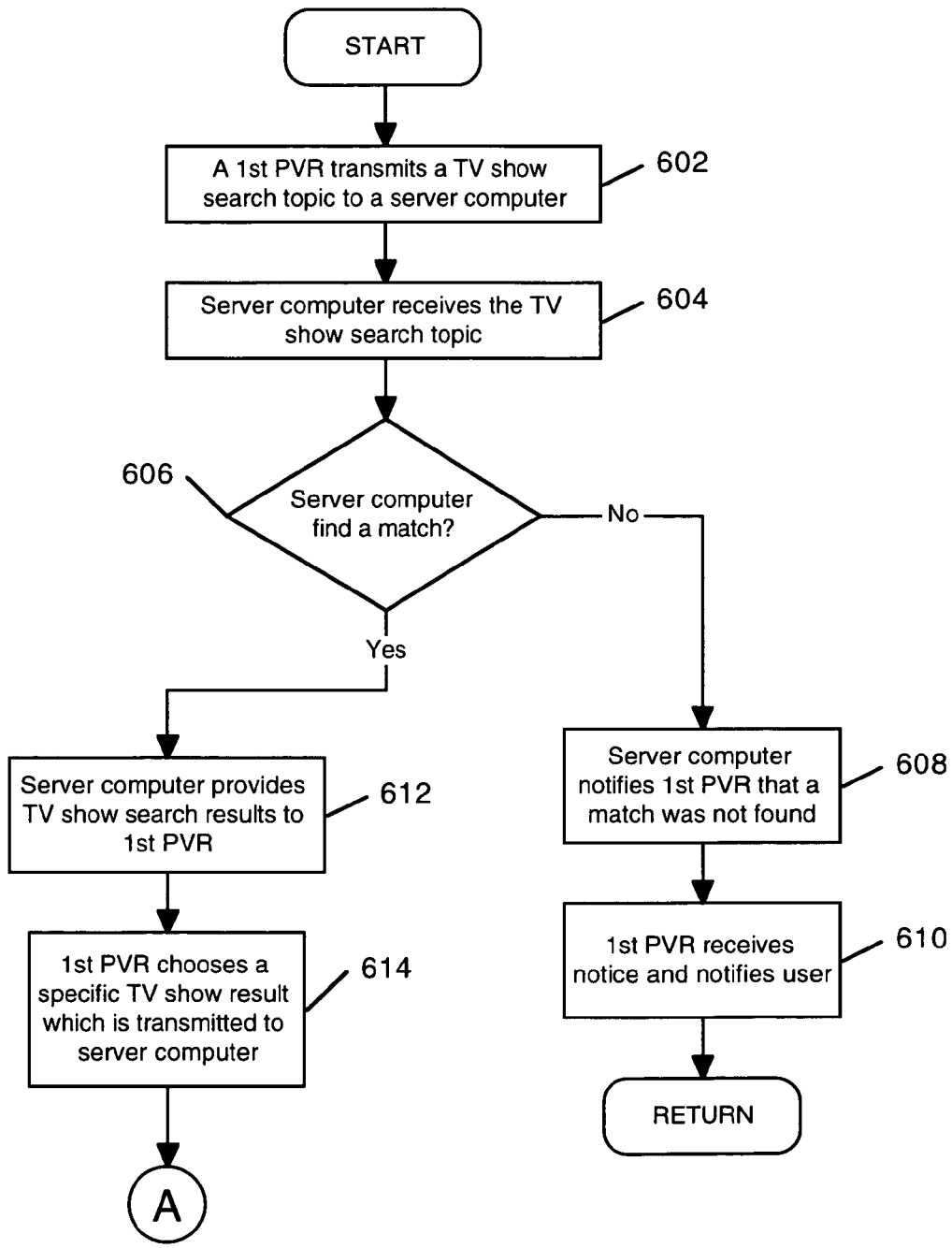
FIGS. 6A and 6B are a flowchart of steps performed in accordance with one embodiment of the present invention for providing a television show search functionality to a personalized video recorder thereby enabling it to request and receive specific television shows from remote locations.
Figure 6B:
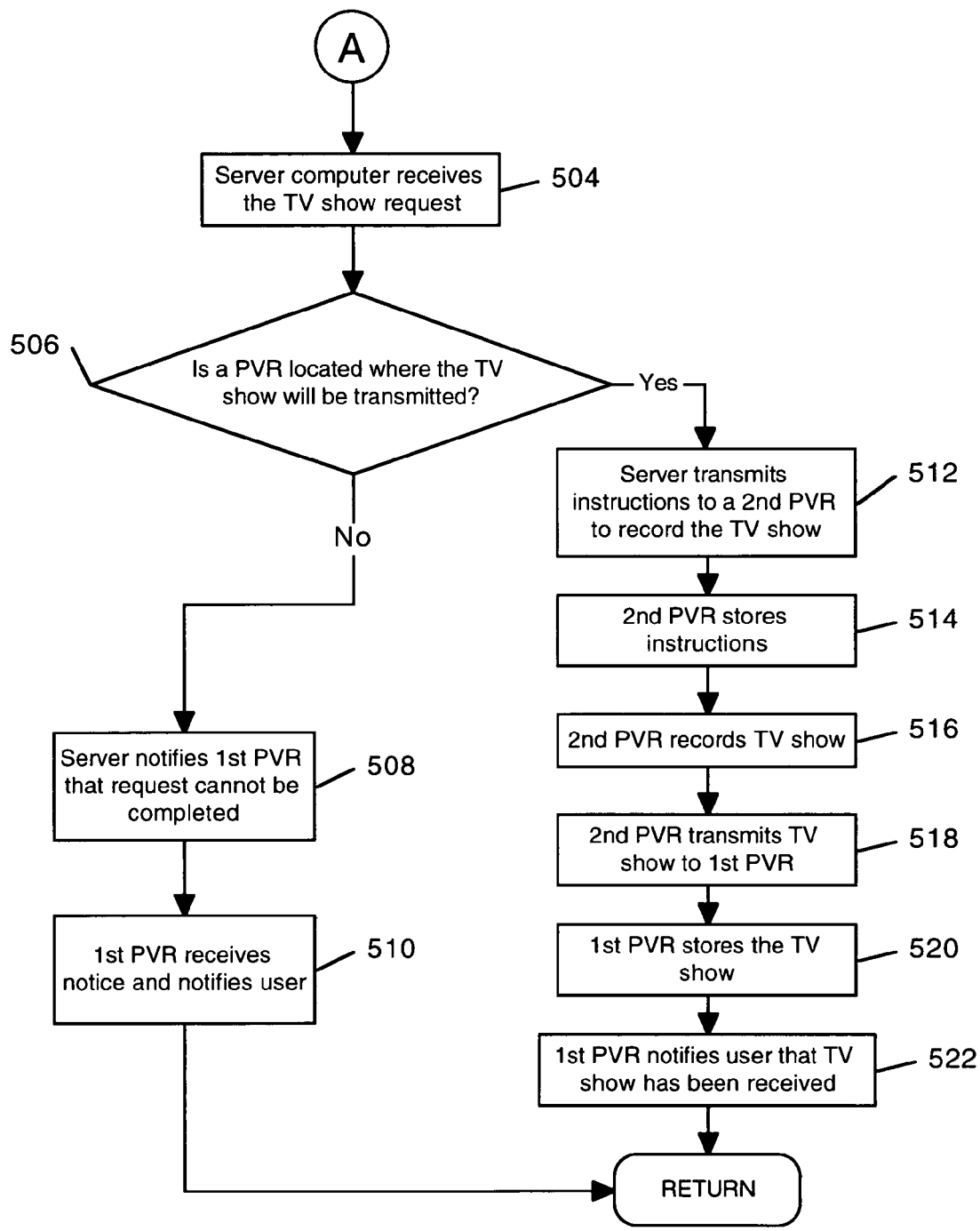

FIGS. 6A and 6B are a flowchart 600 of steps performed in accordance with one embodiment of the present invention for providing a television show search functionality to a personalized video recorder (e.g., 200) thereby enabling it to request and receive specific television shows from remote locations. Flowchart 600 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 600, such steps are exemplary. That is, the present invention is well suited to performing various other steps or variations of the steps recited in FIGS. 6A and 6B. Within the present embodiment, it should be appreciated that the steps of flowchart 600 may be performed by software or hardware or any combination of software and hardware.

The present embodiment provides a television show search functionality to personalized video recorder 200 thereby enabling it to request and receive specific television shows from remote locations that may be unavailable from its television content provider (e.g., television head-end 306). Specifically, personalized video recorder 200 transmits a television show search topic to a server computer (e.g., 304) that is communicatively coupled to it. Upon reception of the television show search topic, server computer 304 determines whether there is one or more television shows that match the television show search topic within a television programming database (e.g., worldwide, nationwide, statewide, and the like). If there is one or more matches, the server computer transmits the search results to personalized video recorder 200. From the search results, a user of personalized video recorder 200 may cause it to request delivery of one or more of these television shows from server computer 304.

Once server computer 304 receives the television show request from personalized video recorder 200, the present embodiment of FIGS. 6A and 6B operates in a manner similar to that described above with reference to FIG. 5. That is, upon reception of the request from personalized video recorder 200, server computer 304 determines whether a personalized video recorder (e.g., 200A or 200B) coupled to it is located within a transmission region of the requested television show. If there is, server computer 304 transmits programming instructions to that personalized video recorder to record the requested television show when it is transmitted by a television content provider (e.g., television head-end 308). Once the personalized video recorder (e.g., 200A or 200B) records the requested television show, it transmits the television show to personalized video recorder 200 which is coupled to it. In this manner, the present embodiment provides a television show search functionality to personalized video recorder 200 thereby enabling it to request and receive specific television shows from remote locations that are unavailable from its television content provider (e.g., television head-end 306).

It should be appreciated that flowchart 600 is described in conjunction with FIG. 3 in order to more fully describe the operation of the present embodiment. At step 602 of FIG. 6A, the present embodiment causes personalized video recorder 200 to transmit a television show search topic to server computer 304 that is communicatively coupled to it. The present embodiment may perform step 602 in a wide variety of ways in accordance with the present invention. For example, it is appreciated that personalized video recorder 200 may receive from server computer 304 a television show search form wherein topics may be entered. As such, the present embodiment at step 602 may enable a user of personalized video recorder 200 to fill out the television show search form which is then transmitted to server 11 computer 304. In step 604, server computer 304 receives the television show search topic(s) from personalized video recorder 200.

At step 606, the present embodiment causes server computer 304 to determine whether there is one or more television shows that match the television show search topic within a television programming database (e.g., worldwide, nationwide, statewide, and the like). If server computer 304 determines that there is one or more television shows that match the television show search topic at step 606, the present embodiment proceeds to step 612. However, if server computer 304 determines that there are no television shows that match the television show search topic at step 606, the present embodiment proceeds to step 608.

In step 608, the present embodiment causes server computer 304 to transmit a notification to personalized video recorder 200 indicating that no television shows matched the submitted television show search topic. At step 610, once personalized video recorder 200 receives the notification, the present embodiment causes personalized video recorder 200 to informs its user of this information. It is appreciated that the present embodiment may perform step 610 in a wide variety of ways in accordance with the present invention. For example, the present embodiment may cause personalized video recorder 200 to output to display device 212 a message informing its user that no television shows matched the submitted television show search topic. After the completion of step 610, the present embodiment exits flowchart 600.

At step 612 of FIG. 6A, if one or more television shows matches the submitted television show search topic, the present embodiment causes server computer 304 to transmit the television show search results to personalized video recorder 200. In step 614, the present embodiment causes personalized video recorder 200 to request delivery of one of the search result television shows provided by server computer 304. Upon completion of step 614, the present embodiment proceeds to step 504 of FIG. 6B. It is understood that steps 504–522 of FIG. 6B are similar to steps 504–522 of FIG. 5 described above. Furthermore, it is appreciated that flowchart 600 of FIG. 6A and 6B may be modified such that the present embodiment may cause server computer 304 to utilize two or more personalized video recorders (e.g., 200A and 200B) to record the requested television show when it is transmitted by a television content provider (e.g., television head-end 308).

Flowchart 600 of FIGS. 6A and 6B is well suited to be modified such that the present embodiment may operate with any type of media content (e.g., audio, video, graphics, information, data, software, and/or the like) in any type of format. For example, the server computer (e.g., 304) may be modified such that it provides a search functionality and management system to personalized video recorders (e.g., 200) for any type of media content. Furthermore, the television content providers (e.g., television head-ends 306 and 308) may be substituted with any type of media content providers.

Figure 7A:
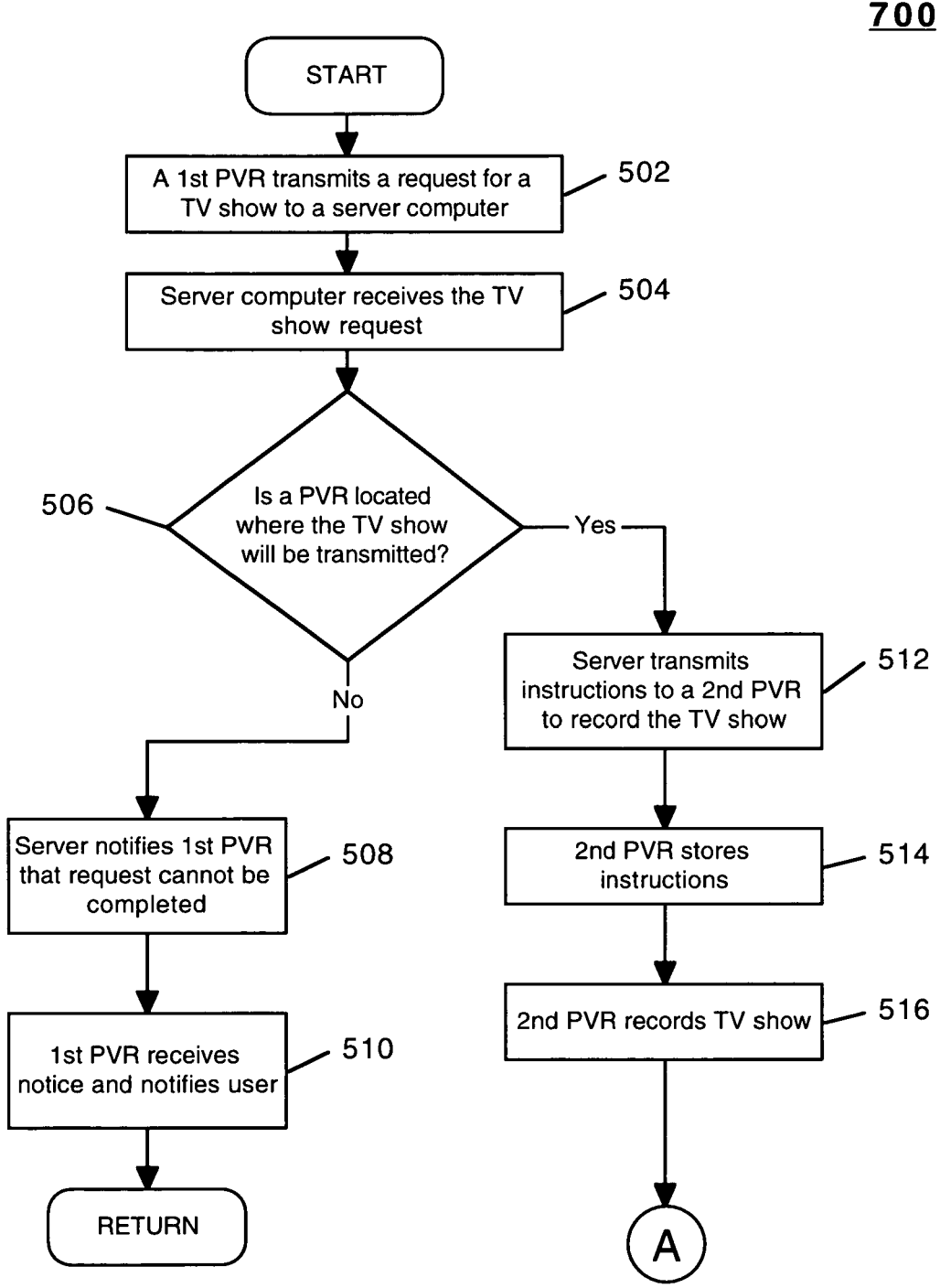
FIGS. 7A and 7B are a flowchart of steps performed in accordance with one embodiment of the present invention for enabling a personalized video recorder to receive specific television shows from a server computer.
Figure 7B:
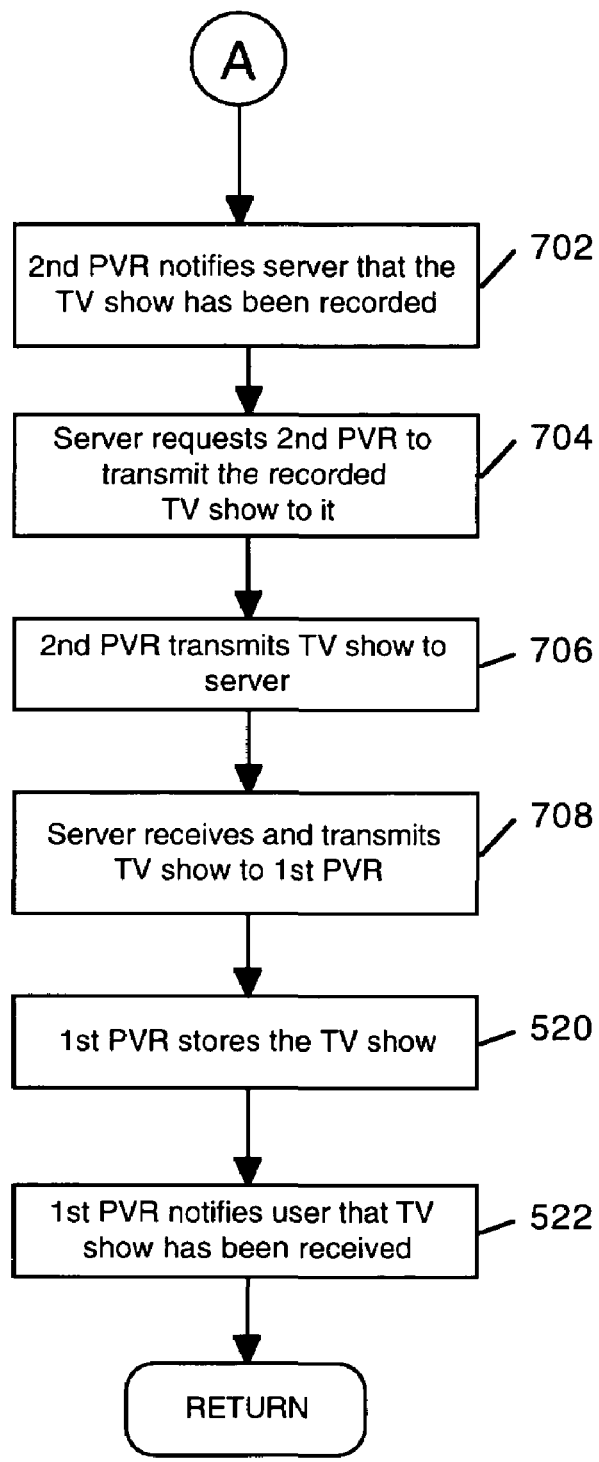

FIGS. 7A and 7B are a flowchart 700 of steps performed in accordance with one embodiment of the present invention for enabling a personalized video recorder (e.g., 200) to receive specific television shows from a server computer (e.g., 304). Flowchart 700 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 700, such steps are exemplary. That is, the present invention is well suited to performing various other steps or variations of the steps recited in FIGS. 7A and 7B. Within the present embodiment, it should be appreciated that the steps of flowchart 700 may be performed by software or hardware or any combination of software and hardware.

The present embodiment enables personalized video recorder 200 to order and receive specific television shows that may be unavailable from its television content provider (e.g., television head-end 306). Specifically, personalized video recorder 200 transmits a request for delivery of a specific television show to a server computer (e.g., 304) that is communicatively coupled to it. Upon reception of the television show request, the server computer determines whether a personalized video recorder (e.g., 200A or 200B) coupled to it is located within a transmission region of the requested television show. If there is, the server computer transmits programming instructions to that personalized video recorder (e.g., 200A or 200B) to record the requested television show when it is transmitted by a television content provider (e.g., television head-end 308). Once the personalized video recorder (e.g., 200A or 200B) records the television show, it transmits the television show to the server computer. The server computer then transmits the recorded television show to personalized video recorder 200. In this manner, the present embodiment enables personalized video recorder 200 to order and receive specific television shows that are unavailable from its television content provider (e.g., 306).

It should be appreciated that flowchart 700 is described in conjunction with FIG. 3 in order to more fully describe the operation of the present embodiment. Furthermore, it is understood that steps 502–516, 520 and 522 of FIGS. 7A and 7B are similar to steps 502–516, 520 and 522 of FIG. 5 described above. However, once step 516 of FIG. 7A is completed, the present embodiment proceeds to step 702 of FIG. 7B. At step 702, the present embodiment causes the personalized video recorder (e.g., 200A or 200B) to transmit a notification to server computer 304 that the requested television show has been recorded. In step 704, once server computer 304 receives the notification, the present embodiment subsequently causes server computer 304 to transmit instructions to the personalized video recorder (e.g., 200A or 200B) directing it to transmit the recorded television show to server computer 304. At step 706, once the personalized video recorder (e.g., 200A or 200B) receives the transmit instructions, the present embodiment causes the personalized video recorder to transmit the recorded television show to server computer 304. In step 708, once server computer 304 receives the recorded television show, the present embodiment causes server computer 304 to transmit the recorded television show to personalized video recorder 200. Once step 708 is completed, the present embodiment proceeds to step 520.

It is understood that flowchart 700 of FIGS. 7A and 7B may be modified such that the present embodiment may cause server computer 304 to utilize two or more personalized video recorders (e.g., 200A and 200B) to record the requested television show when it is transmitted by a television content provider (e.g., television head-end 308).

Flowchart 700 of FIGS. 7A and 7B is well suited to be modified such that the present embodiment may operate with any type of media content (e.g., audio, video, graphics, information, data, software, and/or the like) in any type of format. For example, the television content providers (e.g., television head-ends 306 and 308) may be substituted with any type of media content providers. Additionally, the server computer (e.g., 304) may be modified such that it provides a management system to personalized video recorders (e.g., 200) for any type of media content.

Figure 8A:
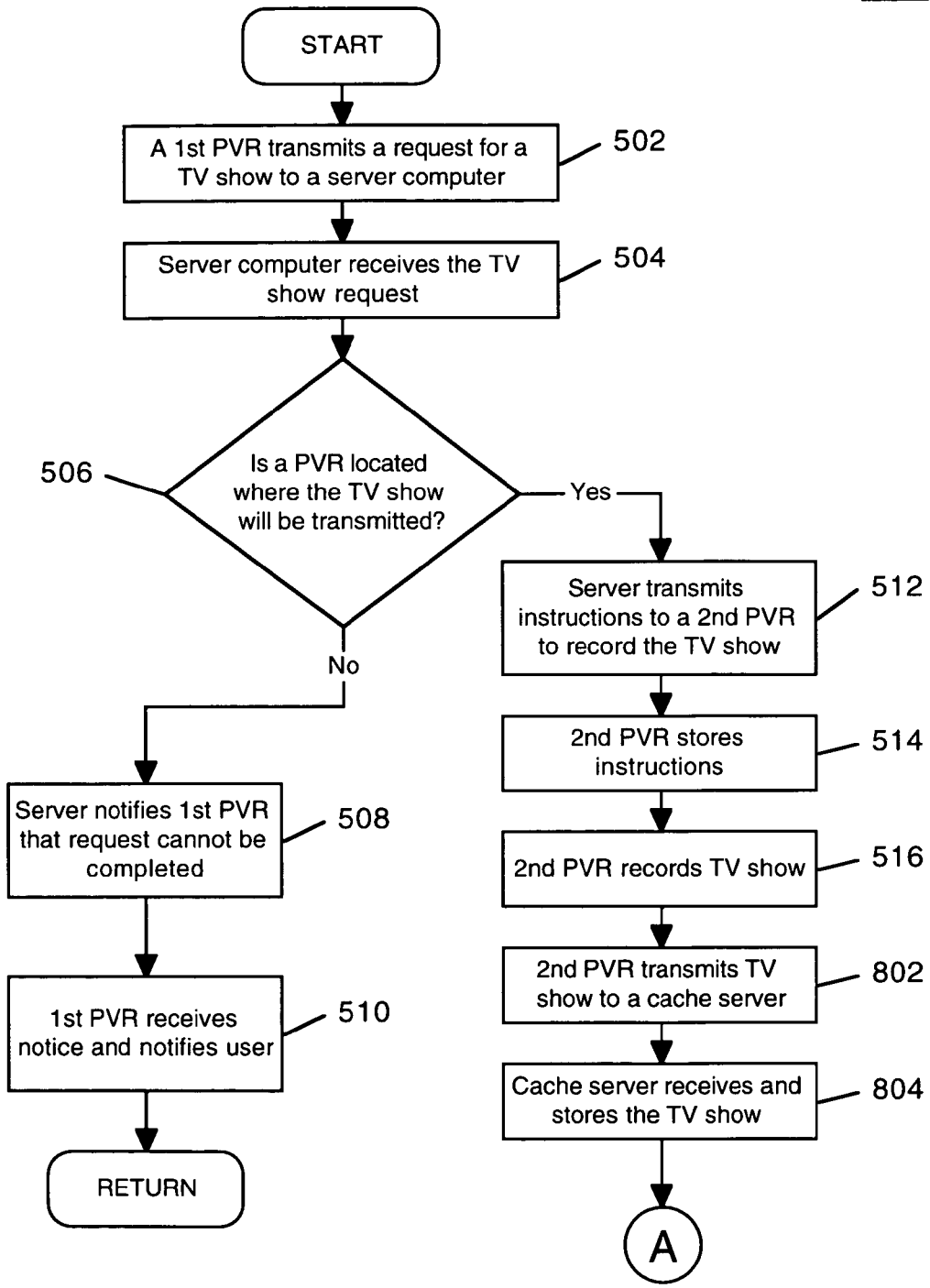
FIGS. 8A and 8B are a flowchart of steps performed in accordance with one embodiment of the present invention for enabling personalized video recorders to receive specific television shows from a cache server computer.
Figure 8B:
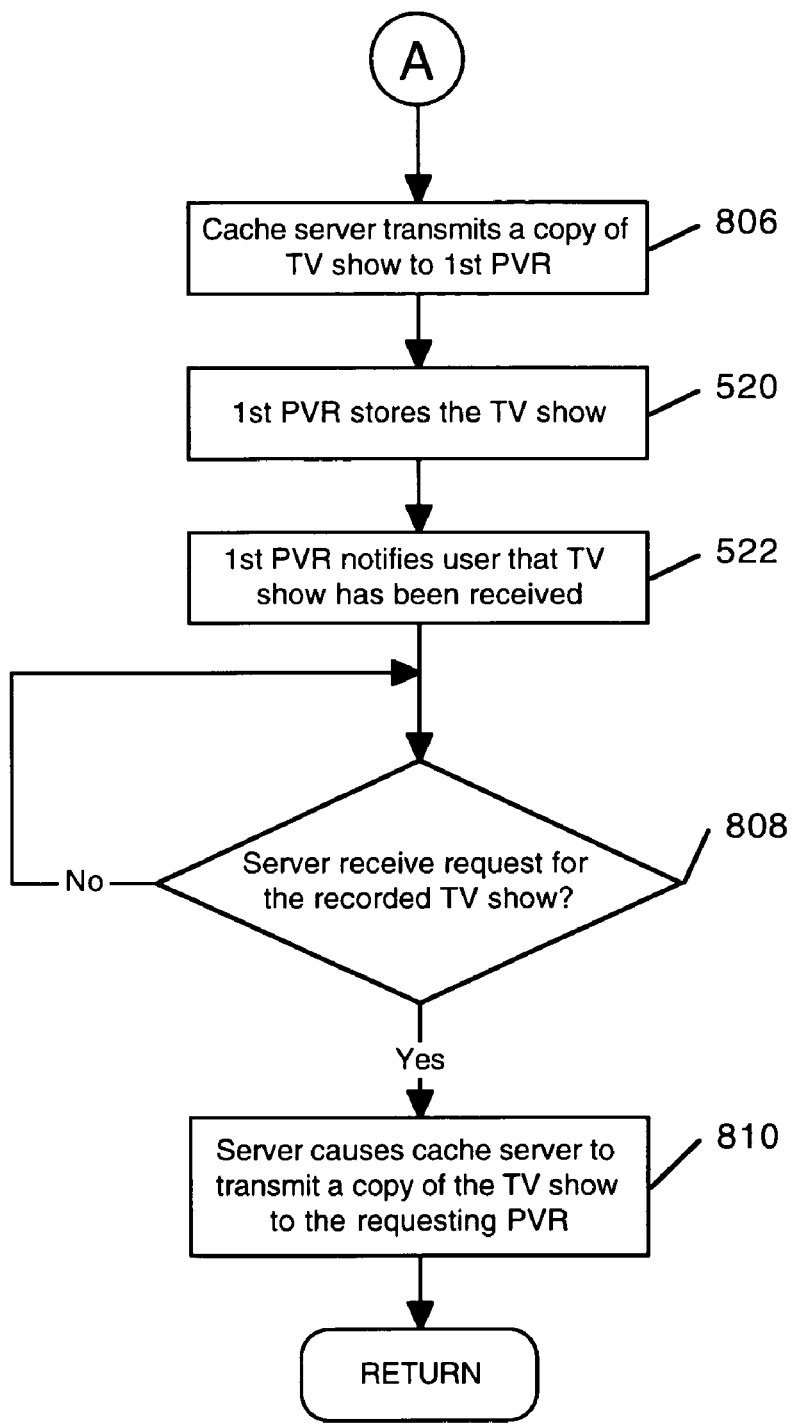

FIGS. 8A and 8B are a flowchart 800 of steps performed in accordance with one embodiment of the present invention for enabling personalized video recorders (e.g., 200 and 200C) to receive specific television shows from a cache server computer (e.g., 402). Flowchart 800 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 800, such steps are exemplary. That is, the present invention is well suited to performing various other steps or variations of the steps recited in FIGS. 8A and 8B. Within the present embodiment, it should be appreciated that the steps of flowchart 800 may be performed by software or hardware or any combination of software and hardware.

The present embodiment enables personalized video recorders 200 and 200C to order and receive specific television shows that may be unavailable from its television content provider (e.g., television head-end 306). Specifically, personalized video recorder 200 transmits a request for delivery of a specific television show to a server computer (e.g., 304) that is communicatively coupled to it. Upon reception of the television show request, the server computer determines whether a personalized video recorder (e.g., 200A or 200B) coupled to it is located within a transmission region of the requested television show. If there is, the server computer transmits programming instructions to that personalized video recorder to record the requested television show when it is transmitted by a television content provider (e.g., television head-end 308). Once the personalized video recorder (e.g., 200A or 200B) records the television show, it transmits the recorded television show to a cache server computer (e.g., 402). The cache server computer receives and stores the recorded television show. Additionally, the cache server transmits a copy of the recorded television show to personalized video recorder 200. Moreover, if another personalized video recorder (e.g., 200C) requests delivery of the recorded television show from the server computer, the server computer is able to cause the cache server to transmit a copy of the recorded television show to that personalized video recorder. In this manner, the present embodiment enables personalized video recorders (e.g., 200 and 200C) to receive specific television shows from a cache server computer (e.g., 402) that are unavailable from their television content provider.

It should be appreciated that flowchart 800 is described in conjunction with FIG. 4 in order to more fully describe the operation of the present embodiment. Furthermore, it is understood that steps 502–516, 520 and 522 of FIGS. 8A and 8B are similar to steps 502–516, 520 and 522 of FIG. 5 described above. However, once step 516 of FIG. 8A is completed, the present embodiment proceeds to step 802 of FIG. 8A. At step 802, the present embodiment causes the personalized video recorder (e.g., 200A or 200B) to transmit the recorded television show to a cache server computer (e.g., 402). In step 804, once cache server 402 receives the recorded television show, the present embodiment causes cache server 402 to store the recorded television show. Within the present embodiment, it is appreciated that cache server 402 may utilize one or more of its memory units (e.g., 104, 106, and 118) to store the recorded television show.

At step 806 of FIG. 8B, the present embodiment causes cache server 402 to transmit a copy of the recorded television show to personalized video recorder 200. Once step 806 is completed, the present embodiment proceeds to step 520. Once steps 520 and 522 are completed, the present embodiment proceeds to step 808. In step 808, the present embodiment determines whether server computer 304 has received a delivery request for the recorded television show from a device (e.g., personalized video recorder 200C). If the present embodiment determines that server computer 304 has not received a delivery request for the recorded television show at step 808, the present embodiment proceeds to the beginning of step 808. However, if the present embodiment determines that server computer 304 has received a delivery request for the recorded television show at step 808, the present embodiment proceeds to step 810. At step 810, the present embodiment causes server computer 304 to transmit instructions to cache server 402. One of the purposes of the instructions of step 810 is to cause cache server 402 to transmit a copy of the recorded television show to the requesting device (e.g., personalized video recorder 200C). In this manner, a database of "unavailable" recorded television shows may be created in order to satisfy television show delivery requests.

It is appreciated that flowchart 800 of FIGS. 8A and 8B may be modified such that the present embodiment may cause server computer 304 to utilize two or more personalized video recorders (e.g., 200A and 200B) to record the requested television show when it is transmitted by a television content provider (e.g., television head-end 308).

Flowchart 800 of FIGS. 8A and 8B is well suited to be modified such that the present embodiment may operate with any type of media content (e.g., audio, video, graphics, information, data, software, and/or the like) in any type of format. For example, the television content providers (e.g., television head-ends 306 and 308) may be substituted with any type of media content providers. Additionally, the server computer (e.g., 304) may be modified such that it provides a management system to personalized video recorders (e.g., 200) for any type of media content. Furthermore, the cache server (e.g., 402) may be modified such that it operates with any type of media content.

It should be noted that flowcharts 500, 600, 700, and 800 of FIGS. 5, 6A, 6B 7A, 7B, 8A and 8B may be modified such that each device (e.g., personalized video recorders 200 and 200C) requesting delivery of a television show (or any other type of media content) may be required to pay for it. For example, before allowing submission of a television show delivery request, the server computer (e.g., 304) may request registration information from each requesting device (e.g., personalized video recorders 200 and 200C) that may include its user's name, credit card number, and/or mailing address. Once this information is received and verified, the server computer (e.g., 304) would allow the requesting device (e.g., personalized video recorders 200 and 200C) to submit a television show (or any other type of media content) delivery request. It should be understood that this registration information may be subsequently transmitted by the server computer (e.g., 304) to one or more television content providers (or any other media content providers) for further processing and/or collection.

Additionally, it should be understood that flowcharts 500, 600, 700, and 800 of FIGS. 5, 6A, 6B, 7A, 7B, 8A and 8B may be modified such that enhanced television content (e.g., from the Internet) may be collected by the server computer (e.g., 304) and transmitted to the requesting device (e.g., personalized video recorders 200 and 200C) along with the recorded television show. Furthermore, the enhanced television content provided by the server computer (e.g., 304) may correspond to the general topic of the requested television show.

Accordingly, the present invention provides a method and system which enables television viewers to receive desired television programming which is broadcast in remote locations throughout the world.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method comprising:
   a server computer receiving a request from a first personalized video recorder for a television show;
   said server computer locating a second personalized video recorder capable of receiving a broadcast of said television show that satisfies said request;
   said second personalized video recorder receiving a programming instruction from said server computer to record said television show when broadcast by a television content provider, after said server computer locating said second personalized video recorder;
   said second personalized video recorder recording said television show during broadcast of said television show by said television content provider, after said second personalized video recorder receiving said programming instruction; and said first personalized video recorder receiving said television show recorded by said second personalized video recorder.

2. The method as described in claim 1 further comprising said second personalized video recorder adding said programming instruction to its programmable task list.

3. The method as described in claim 1 further comprising said first personalized video recorder receiving an electronic programming guide from said server computer.

4. The method as described in claim 3 wherein said electronic programming guide comprises worldwide television programming.

5. The method as described in claim 1 wherein said programming instruction comprises an Internet Protocol (IP) address of said first personalized video recorder.

6. The method as described in claim 1 further comprising said first personalized video recorder transmitting a television show search topic to said server computer.

7. The method as described in claim 1 wherein said first personalized video recorder, server computer, and second personalized video recorder are coupled via the Internet.

8. The method as described in claim 1 further comprising:
utilizing an electronic programming guide to transmit said request to said server computer.

9. The method as described in claim 1 further comprising:
said first personalized video recorder storing said television show recorded by said second personalized video recorder.

10. The method as described in claim 1 further comprising:
said first personalized video recorder notifying that said television show has been received.

11. The method as described in claim 10 wherein said first personalized video recorder notifying that said television show has been received comprises outputting a message to a display device.

12. The method as described in claim 1 further comprising:
said second personalized video recorder transmitting said television show recorded by it to said first personalized video recorder.

13. The method as described in claim 1 further comprising:
said server computer receiving said television show recorded by said second personalized video recorder and transmitting it to said first personalized video recorder.

14. The method as described in claim 1 further comprising:
a cache server computer receiving and storing said television show recorded by said second personalized video recorder; and
said cache server transmitting a copy of said television show recorded by said second personalized video recorder to said first personalized video recorder.

15. The method as described in claim 14 further comprising:
in response to said server computer receiving a second request from a receiver device for said television show, said cache server transmitting a second copy of said television show recorded by said second personalized video recorder to said receiver device.

16. A computer readable medium having computer readable code embodied therein for causing a system to perform a method comprising:
a server computer receiving a request from a receiver device for a television show;
said server computer locating a plurality of digital video recorders capable of receiving a broadcast of said television show that satisfies said request;
each of said plurality of digital video recorders receiving a programming instruction from said server computer to record said television show when broadcast by a television content provider, after said server computer locating said plurality of digital video recorders;
at least one of said plurality of digital video recorders recording said television show during broadcast of said television show by said television content provider, after said each of said plurality of digital video recorders receiving said programming instruction; and
said receiver device receiving said television show recorded by said at least one of said plurality of digital video recorders.

17. The computer readable medium of claim 16 further comprising each of said plurality of digital video recorders adding said programming instruction to its programmable task list.

18. The computer readable medium of claim 16 further comprising said receiver device receiving an electronic programming guide from said server computer.

19. The computer readable medium of claim 18 wherein said electronic programming guide comprises worldwide television programming.

20. The computer readable medium of claim 16 wherein said programming instruction comprises an Internet Protocol (IP) address of said receiver device.

21. The computer readable medium of claim 16 further comprising said receiver device transmitting a television show search topic to said server computer.

22. The computer readable medium of claim 16 wherein said receiver device, server computer, and plurality of digital video recorders are coupled via the Internet.

23. The computer readable medium of claim 16 wherein said receiver device comprises a television Internet box.

24. The computer readable medium of claim 16 wherein said receiver device comprises a computer.

25. The computer readable medium of claim 16 wherein said receiver device comprises a set-top-box.

26. The computer readable medium of claim 16 wherein said receiver device comprises a digital video recorder.

27. The computer readable medium of claim 16 further comprising:
said at least one of said plurality of digital video recorders transmitting said television show recorded by it to said receiver device.

28. The computer readable medium of claim 16 further comprising:
said server computer receiving said television show recorded by said at least one of said plurality of digital video recorders and transmitting it to said receiver device.

29. The computer readable medium of claim 16 further comprising:
a cache server computer receiving and storing said television show recorded by said at least one of said plurality of digital video recorders; and
said cache server transmitting a copy of said television show to said receiver device.

30. The computer readable medium of claim 29 further comprising:
in response to said server computer receiving a second request from a second receiver device for said television show, said cache server transmitting a second copy of said television show to said second receiver device.

31. A method comprising:
- a server computer receiving a request from a receiver device for a television show;
- said server computer locating a plurality of digital video recorders capable of receiving a broadcast of said television show that satisfies said request;
- each of said plurality of digital video recorders receiving a programming instruction from said server computer to record said television show when broadcast by a television content provider, after said server computer locating said plurality of digital video recorders;
- at least one of said plurality of digital video recorders recording said television show during broadcast of said television show by said television content provider, after said each of said plurality of digital video recorders receiving said programming instruction; and
- said receiver device receiving said television show recorded by said at least one of said plurality of digital video recorders.

32. The method as described in claim 31 further comprising each of said plurality of digital video recorders adding said programming instruction to its programmable task list.

33. The method as described in claim 31 further comprising said receiver device receiving an electronic programming guide from said server computer.

34. The method as described in claim 33 wherein said electronic programming guide comprises worldwide television programming.

35. The method as described in claim 31 wherein said programming instruction comprises an Internet Protocol (IP) address of said receiver device.

36. The method as described in claim 31 wherein said receiver device comprises a digital video recorder.

37. The method as described in claim 31 further comprising:
- a cache server computer receiving and storing said television show recorded by said at least one of said plurality of digital video recorders; and
- said cache server transmitting a first copy of said television show to said receiver device.

38. The method as described in claim 31 further comprising:
- said at least one of said plurality of digital video recorders transmitting said television show to said receiver device.

39. The method as described in claim 31 further comprising:
- said server computer receiving said television show recorded by said at least one of said plurality of digital video recorders and transmitting it to said receiver device.

* * * * *